United States Patent [19]
Leger

[11] Patent Number: 5,732,286
[45] Date of Patent: Mar. 24, 1998

[54] FIFO BASED RECEIVE PACKET THROTTLE FOR RECEIVING LONG STRINGS OF SHORT DATA PACKETS

[75] Inventor: Geary L. Leger, Fremont, Calif.

[73] Assignee: Cirrus Logic, Inc., Fremont, Calif.

[21] Appl. No.: 513,463

[22] Filed: Aug. 10, 1995

[51] Int. Cl.$^6$ ............................................. G06F 05/06
[52] U.S. Cl. .................................... 395/877; 395/876
[58] Field of Search ............................ 395/250, 872, 395/873, 874, 876, 877; 370/413

[56] References Cited

U.S. PATENT DOCUMENTS

| | | | |
|---|---|---|---|
| 4,852,088 | 7/1989 | Gulick et al. | 370/413 |
| 4,860,244 | 8/1989 | Bruckert et al. | 395/872 |
| 5,369,775 | 11/1994 | Yamasaki et al. | 395/250 |
| 5,390,299 | 2/1995 | Rege et al. | 395/250 |
| 5,434,892 | 7/1995 | Dike et al. | 395/250 |
| 5,557,750 | 9/1996 | Moore et al. | 395/250 |

*Primary Examiner*—Parshotam S. Lall
*Assistant Examiner*—Patrice L. Winder
*Attorney, Agent, or Firm*—Steven A. Shaw; Frank D. Nguyen; J. P. Violette

[57] ABSTRACT

An apparatus and method for efficiently receiving a long string of short data packets. Storing a long string of short data packets received from external devices can be inefficient in terms of system resources such as system memory and CPU time. In the preferred embodiment of the present invention, both the number of data packets in the FIFO buffer and the demand of system memory are monitored. A FIFO buffer of at least 32 bytes deep and having a packet-based threshold is implemented to monitor the number of data packets in the FIFO buffer. When the number of data packets in the FIFO buffer is equal to or exceeds the threshold and there is a predetermined number of free buffer memory available, data is transferred from the FIFO buffer to system memory. The number of data packets transferred from the FIFO buffer is also monitored to control the amount of data transfer. Any data stuck inside the FIFO buffer for a predetermined period of time is automatically unloaded. In an alternate embodiment, a FIFO buffer of at least 32 bytes deep and having an upper limit packet-based threshold and a lower limit packet-based threshold is used. A data transfer request is initiated when data in the FIFO buffer reaches the upper limit threshold. Conversely, a stop transfer request is initiated when data in the FIFO buffer is equal to or less than the lower limit threshold.

18 Claims, 8 Drawing Sheets

FIFO BASED RECEIVE PACKET THROTTLE FOR RECEIVING LONG STRINGS OF SHORT DATA PACKETS

TECHNICAL FIELD

This invention relates generally to peripheral hardware controllers in computer systems, and more particularly to a controller that uses a FIFO buffer to control data transfer across a CPU bus to and from peripheral devices.

BACKGROUND OF THE INVENTION

In computer equipment, a first-in, first-out (FIFO) buffer is a temporary storage device. Data is stored in a FIFO buffer and retrieved from the buffer on a first-in, first-out basis. Because the functional character of a FIFO buffer is compatible with the sequential nature of data streams transmitted and received by computer systems, a FIFO buffer is useful in a number of different applications. One particularly important utility of a FIFO buffer is as a time buffer. A FIFO buffer can store output transmitted from one device until the receiving device is ready for it thereby providing time independence between the two devices. In addition to accommodating data transfer devices with different speeds, a FIFO buffer is also used to accommodate bus traffic when too many data devices share the same data bus.

The size of a FIFO buffer is directly related to its width and depth. As an illustration of a FIFO buffer, consider the following analogy. A FIFO buffer can be analogized to a can of tennis balls opened on both ends in which the balls inside the can are analogized to data stored inside a FIFO buffer and the diameter and length of the can are compared to the width and depth of a FIFO buffer respectively. As such, the width of a FIFO buffer determines the width of data layers to be received by a FIFO buffer while the depth of a FIFO buffer determines how many of these data layers can be stored inside a FIFO buffer.

Traditionally, a FIFO buffer controls data transfer by incorporating a FIFO threshold which triggers a data transfer when the number of bytes in the FIFO buffer crosses the threshold value. As such, traditional FIFO control mechanisms are byte-based. Up to now, byte-based FIFO control mechanisms are used exclusively because only byte-based FIFO control mechanisms make sense in view of the relatively shallow depth of FIFOs. Due to limitation of semiconductor processing technology in the 1980s and early 1990s, the largest depth of FIFO buffers was 16 bytes. For example, data communications controllers, such as the CLCD2400/2401 and CL-CD2430/2431 which are manufactured and marketed by Cirrus Logic, Inc. of Fremont, Calif., have 16 byte transmit and receive FIFO buffers.

In the area of data communications, however, data is transferred in "packets" (or "frames"), a serial string of bits, that vary widely in size. For example, packets of data generated by the movement of a point and click device or a keyboard stroke are relatively small in size. Packets of data associated with files, by contrast, are relatively large. A packet has a start-of-frame delimiter (SFD). Generally, a packet may also include the preamble, destination address (DA), source address (SA), length field, data field, pad bits (if necessary), frame check sequence (FCS, also called CRC), and end-of-frame delimiter (EFD).

One of the worst timing constraints on any data communication system is to receive a relatively long string of short data packets with minimum spacing between the packets (hereinafter long-short). In a data receiving process, a FIFO buffer implemented inside a peripheral hardware controller provides limited internal storage to continue receiving data from external devices while waiting for the host CPU to retrieve the received data for processing. As such, when a long-short is received by a data communication system, a receive FIFO buffer inside the peripheral hardware controller temporary stores the data packets and serially feeds these data packets to the host CPU for processing in the order the packets were received. While receive packets can and do come into a data communications system at any time, the system has control over when transmit packets are transmitted. For this reason, long-shorts are primarily a receiver problem.

Receiving a long-short may severely strain CPU resources, such as CPU time and memory storage, such that other data transfer requests cannot be serviced timely leading to lost data packets. Because the host CPU may be interrupted every time it receives a data packet, the CPU time required for servicing interrupt services routines is high. The CPU overhead in terms of time is especially costly considering that only short data packets are involved. In addition, short data packets cause inefficient use of the CPU main memory because each small packet of data is stored in a relatively large memory buffer.

As multi-channel peripheral hardware controllers are introduced, problems related to long-short data packets become more pressing. With multi-channel peripheral hardware controllers, there are more data communications channels and therefore more bus traffic. Consequently, there is a greater chance of having long-short problems on one or more data communications channels.

Traditional byte-based FIFO threshold mechanisms are not solutions to problems related to long-shorts because their implementation exclude from a FIFO buffer the inability to efficiently receive a long data packet all at once. More significantly, however, FIFO threshold mechanisms lack the ability to monitor transactional activities such as system memory demand in controlling FIFO data transfer. Given the increase in I/O channels, monitoring the level of transactional activities in controlling FIFO data transfer is crucial in managing system resources more efficiently.

OBJECTS AND SUMMARY OF THE INVENTION

One object of the present invention is to efficiently receive long strings of short data packets without severely straining available CPU resources and avoiding lost data packets.

Another object of the present invention is to include transactional activity level as a factor in efficiently handling long strings of short data packets without severely straining available CPU resources and avoiding lost data packets.

These and other needs are met by various aspects of the present invention, wherein briefly stated, one aspect is an apparatus for efficiently receiving long strings of short data packets having marking tags to identify each data packet from external devices. Included in the apparatus are: a FIFO buffer of at least 32 bytes deep and has at least one packet-based threshold for storing data packets, the FIFO buffer receives a FIFO input data signal and provides a FIFO output data signal; a first monitor, which is coupled to the FIFO buffer for receiving the FIFO input and output data signals, generates a first signal indicating whether a number of data packets in the FIFO buffer means is equal to or exceeds the packet-based threshold; a second monitor generates a second signal indicating whether at least a number of free memory buffers are available; and a data transferer, which is responsive to both the first and second signals, the data transferer controls data transfer to and from the FIFO buffer means.

In an alternate embodiment of the present invention, the apparatus comprises: a FIFO buffer of at least 32 bytes deep and has an upper limit packet-based threshold and a lower limit packet-based threshold, the FIFO buffer receives a FIFO input data signal and provides a FIFO output data signal; a first monitor is coupled to the FIFO buffer means for receiving the FIFO input and output data signals, the first monitor generates a stop transfer request signal when a number of data packets in the FIFO buffer means is equal to or exceeds the upper limit packet-based threshold; and a second monitor coupled to the FIFO buffer means for receiving the FIFO input and output data signals, the second monitor generates a data transfer request signal when the number of data packets in the FIFO buffer means is equal to or less than the lower limit packet-based threshold.

Another aspect of the present invention is a computer system including a host processor, a system memory, a system bus coupling the host processor to the system memory, and a peripheral hardware controller interposing between the system bus and external devices. The peripheral hardware controller includes an apparatus for efficiently receiving long strings of short data packets having marking tags to identify each data packet from external devices. The apparatus comprises: a FIFO buffer of at least 32 bytes deep and has at least one packet-based threshold, the FIFO buffer receives an FIFO input data signal and provides a FIFO output data signal; a first monitor, which is coupled to the FIFO buffer for receiving the FIFO input and output data signals, generates a first signal indicating whether a number of data packets in the FIFO buffer means is equal to or exceeds the packet-based threshold; a second monitor generates a second signal indicating whether at least a number of free memory buffers are available; and a data transferer, which is responsive to both the first and second signals, the data transferer controls data transfer to and from the FIFO buffer means.

In an alternate embodiment of the computer system above, the apparatus in the computer system comprises: a FIFO buffer of at least 32 bytes deep and has an upper limit packet-based threshold and a lower limit packet-based threshold, the FIFO buffer receives a FIFO input data signal and provides a FIFO output data signal; a first monitor is coupled to the FIFO buffer means for receiving the FIFO input and output data signals, the first monitor generates a stop transfer request signal when a number of data packets in the FIFO buffer means is equal to or exceeds the upper limit packet-based threshold; and a second monitor coupled to the FIFO buffer means for receiving the FIFO input and output data signals, the second monitor generates a data transfer request signal when the number of data packets in the FIFO buffer means is equal to or less than the lower limit packet-based threshold.

Another aspect of the present invention is a method for efficiently receiving long strings of short data packets having marking tags to identify each data packet from external devices. In this method, a FIFO buffer of at least 32 bytes deep and has at least one packet-based threshold is formed; the FIFO buffer is monitored to determine whether a number of data packets in the FIFO buffer means is equal to or exceeds the packet-based threshold; a system memory is monitored to determine whether a predetermined number of free memory buffers are available; data from the FIFO buffer is transferred when the number of data packets in the FIFO buffer means is equal to or exceeds the packet-based threshold and when the predetermined number of free memory buffers is available.

In an alternate embodiment of the method above, a FIFO buffer of at least 32 bytes deep and has at least an upper limit packet-based threshold and a lower limit packet-based threshold is formed; the FIFO buffer is monitored to determine whether a number of data packets in the FIFO buffer means is equal to or exceeds the upper limit packet-based threshold; data from the FIFO buffer is transferred when the number of data packets in the FIFO means is equal to or exceeds the upper limit packet-based threshold; the FIFO buffer is monitored to determine whether the number of data packets in the FIFO buffer means is equal to or less than the lower limit packet-based threshold; and external devices are requested to start sending more data.

The foregoing and other objects, features, aspects, and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
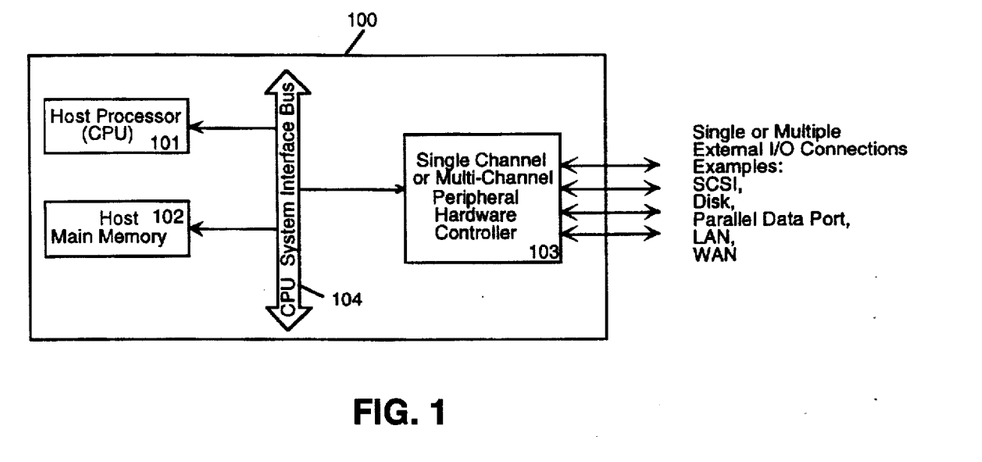
FIG. 1 is a block diagram illustrating a computer system including a peripheral hardware controller which implements the present invention.

FIG. 1 illustrates a computer system utilizing a peripheral hardware controller implemented in accordance with the invention. In FIG. 1, computer system 100 comprises host CPU 101, host memory 102, and peripheral hardware controller 103. Peripheral hardware controller 103 is coupled to host CPU 101 and host memory 102 through system bus 104. Peripheral hardware controller 103 provides an interface between system bus 104 and external I/O devices. More specifically, peripheral hardware controller 103 controls data transfer between system bus 104 and external Input/Output (I/O) interfaces such as disk drive interface, parallel data port interface, small computer system interface (SCSI), local area network (LAN) interface, wide area network (WAN) interface, and the like. While the best mode for practicing the invention is as part of a multi-channel peripheral hardware controller, the invention is equally applicable to single-channel peripheral hardware controller.

Figure 2:
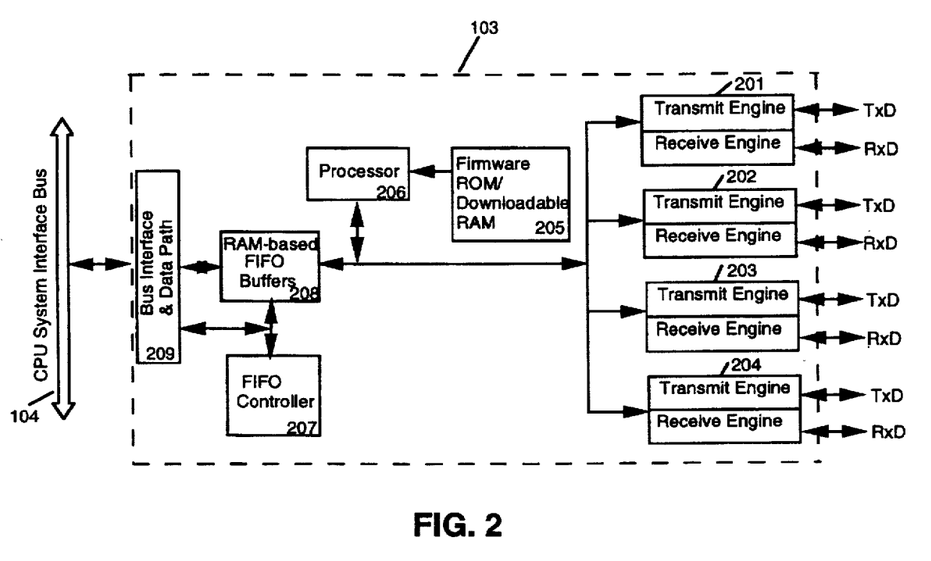
FIG. 2 is a block diagram illustrating in more detail the peripheral hardware controller shown in FIG. 1.

Reference is now made to FIG. 2 which is a block diagram illustrating details of the exemplary multi-channel peripheral hardware controller 103 implementing the present invention. In general, multi-channel peripheral hardware controller 103 performs the following three major tasks: foreground processing, packet processing, and host system interfacing.

As illustrated in FIG. 2, peripheral hardware controller 103, have four serial I/O channels 201-204. It is to be understood that peripheral hardware controller 103 can have any number of serial I/O channels. Each serial I/O channel 201-204 is coupled to an external device. Each serial I/O channel 201-204 comprises a receive engine and a transmit engine. At each receive clock signal, the receive engine of each serial I/O channel samples the value of the RxD pin and reports this value to processor 206 as an interrupt. On the other hand, at each transmit clock signal, the transmit engine of each serial I/O channel outputs a data bit and generates an interrupt to processor 206 to request the next bit for transferring. Transmit and receive engines of each serial I/O channel operate independently of each other, so a channel can simultaneously transmit and receive at different speeds. Well-known interrupt mechanisms may be implemented to handle multiple serial I/O channels contending for service. Tasks associated with priority service scheduling of the multiple serial I/O channels essentially make up foreground processing tasks.

Among other tasks, processor 206 performs packet processing. Packet processing includes assembling data bits from RAM-based FIFO buffer 208 into packets for transmission, dis-assembling received data packets into bits for storing in FIFO buffer 208, formatting assembled data packets, and performing error checking. In carrying out these tasks, processor 206 utilizes firmware stored in ROM (or downloadable RAM) 205. Moreover, through the aid of an interrupt handler (not shown), processor 206 handles and processes interrupts received from multiple serial I/O channels 201-204 to check the status of each serial I/O channels 201-204 and to control data transfer through each Channel. Additionally, processor 206 selects the appropriate bit rates to provide clocking for independent transmit and receive engines on each multiple I/O channel.

To interface with host CPU 101, peripheral hardware controller 103 is coupled to host system interface bus 104 through bus interface and data path logic 209. Bus interface and data path logic 209 controls the rate of data transfer to and from system interface bus 104. Furthermore, depending on the direction of data flow, bus interface and data path logic 209 channels data flow either from bus interface and data path logic 209 to the appropriate transmit FIFO or from the appropriate receive FIFO to bus interface and data path logic 209. FIFO controller 207 provides FIFO buffer management to prevent underflow and overflow conditions to improve FIFO buffer use efficiency and to avoid data loss respectively. FIFO controller 207 also controls data transfer to and from FIFO buffers 208. More importantly, FIFO controller 207 implements receive throttling features of the present invention in managing FIFO buffers 208. For the present invention to function properly, however, a receive FIFO buffer is at least 32 bytes deep. The present invention of FIFO based receive throttle requires deeper FIFO buffers than those buffers available in the 1980's and early 1990's.

Figure 3:
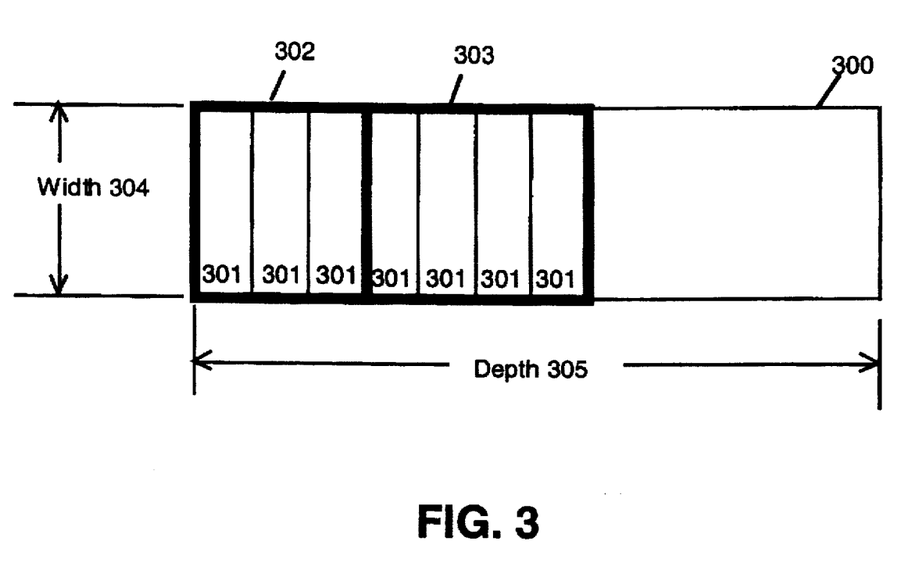
FIG. 3 is a block diagram illustrating the definitions of FIFO width and depth as used in the present invention.

FIG. 3 is a block diagram illustrating the definitions of FIFO depth and width used in the present invention. As illustrated in FIG. 3, FIFO buffer 300 stores data received in data packets consisting of one or more data entities 301. Data packets 302 and 303, which consists of 3 and 4 entities respectively, are illustrated as examples. Because each entity 301 extends across FIFO width 304, the size of FIFO width 304 controls the size of data entities. While FIFO width 304 could be 16-bit words or any other convenient size, preferably, FIFO width 304 has a length of one byte plus tag bits. On the other hand, FIFO depth 305 controls the total number of "entities" and consequently the number of data packets that FIFO buffer 300 is capable of holding.

Figure 4:
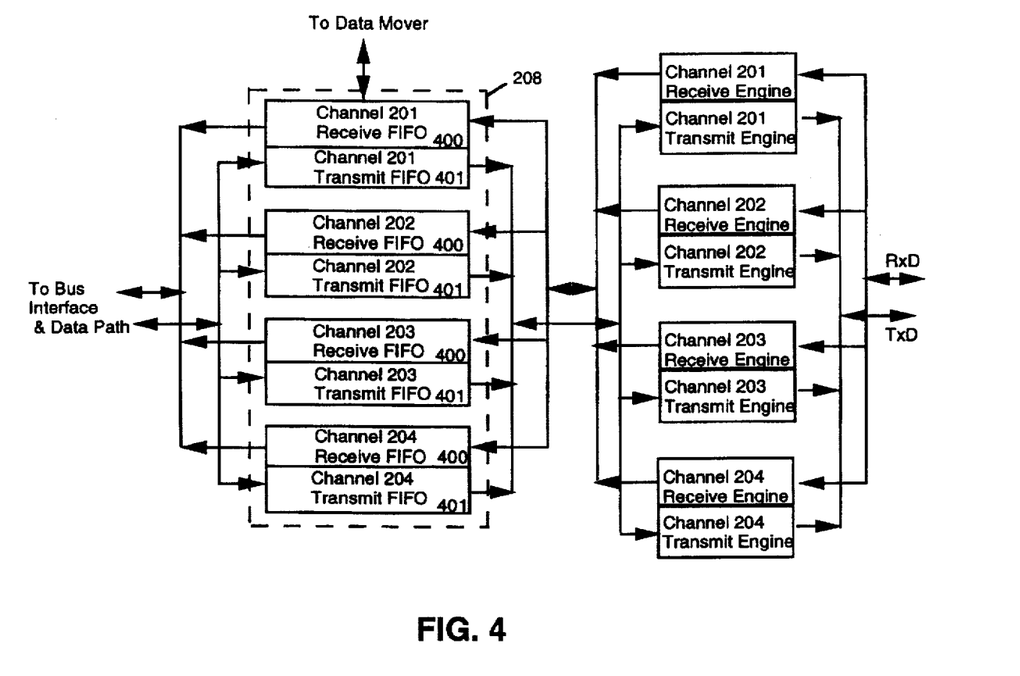
FIG. 4 is a block diagram illustrating the interconnection between the FIFO buffers and the serial I/O channels as implemented in the peripheral hardware controller.

FIG. 4 illustrates RAM-based FIFO buffer 208 implemented as part of the present invention. To allow for simultaneous data transmission and reception, RAM-based FIFO buffer 208 provides a separate receive FIFO buffer 400 and a separate transmit FIFO buffer 401 for each serial I/O channel 201-204. Each receive FIFO buffer 400 and each transmit FIFO buffer 401 are respectively coupled to a receive engine and a transmit engine of the corresponding serial I/O channel.

Figure 5:
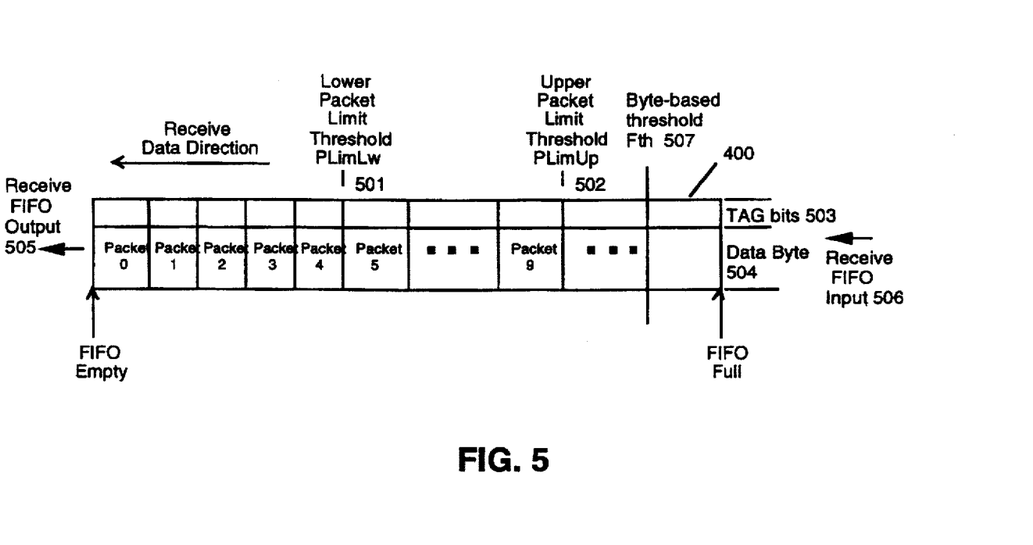
FIG. 5 is a block diagram illustrating a receiving FIFO buffer as implemented in the present invention.

Referring now to FIG. 5, which is a block diagram illustrating details of receive FIFO buffer 400. As illustrated in FIG. 5, receive FIFO buffer 400 has two packet-based thresholds in accordance with the present invention. It is to be appreciated that any number of packet-based thresholds can be implemented and still be within the scope of the present invention. Receive FIFO 400 has a lower packet limit threshold PLimLw 501 and an upper packet limit threshold PLimUp 502. As an example, PLimLw 501 is 5 packets and PLimUp is 10 packets. Each data packet stored in receive FIFO 400 includes TAG bits 503 to identify the beginning of the present packet and the end of the previous packet. Each data packet may vary in size. Receive FIFO buffer 400 inputs data packets at receive FIFO input 506 and outputs data packets at receive FIFO output 505. As an option, byte-based threshold Fth 507 can be included in receive FIFO buffer 400 to monitor the state of FIFO buffer 400 in handling scenarios that are unrelated to long-shorts such as a long data packet.

Figure 6:
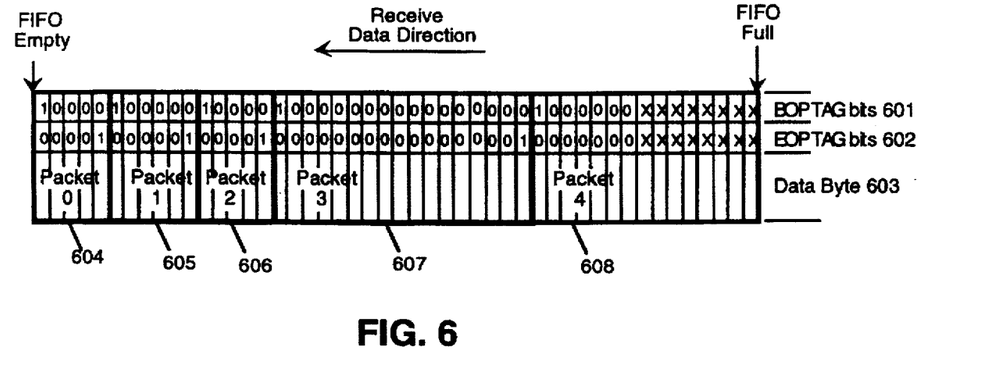
FIG. 6 is a block diagram illustrating in more detail marking tag bits associated with data packets stored in the receiving FIFO buffer shown in FIG. 5.

FIG. 6 is a diagram illustrating in more detail TAG bits 503. In the preferred embodiment of the present invention, there are two TAG bits for each received data character/byte. Each data byte 603 has beginning of packet (BOP) bit 601 and end of packet (EOP) bit 602. It should be clear to a person of ordinary skill in the art that one tag bit (i.e., either BOP bit 501 or EOP bit 502) may be suffice in marking data packets received. However, among other advantages, having two tag bits marking the beginning and end of each data packet provides an error checking capability in determining whether a packet inside receive FIFO buffer 400 is complete since both a marking at the end of a current packet and at the beginning of a following packet can identify a completion of a a packet.

In the preferred data packet marking scheme of the present invention, the BOP bit of a data entity which is the first data entity of a packet is set to 1 and the EOP bit of a data entity which is the last data entity of a packet is also set to 1. On the other hand, received data entities that are neither the first nor last entity of a data packet have their BOP bit 601 and EOP bit 602 set to 0. When an entity is empty, BOP bit 601 and EOP bit 602 have no meaning as denoted by the X symbols. By observing BOP bits 601 and EOP bits 602 in FIG. 6, it is clear that receive FIFO 400 has completely received 4 data packets 604-607. On the other hand, receive FIFO 400 has only partially received data packet 608. It should be clear to one of ordinary skill in the art that a BOP bit may be detected by monitoring a start-of-frame delimiter (SFD) signal and an an EOP bit may be detected by monitoring an end-of-frame delimiter (EFD) signal or an end of packet indicator as provided by a particular communication protocol.

Referring back to FIG. 5, consider as an example a long-short operational sequence of the buffer-available control logic implemented as part of the preferred embodiment in the present invention. In this embodiment, only upper limit PLimUp 502 is required. As receive FIFO buffer 400 fills up (i.e., the number of data packets inside FIFO buffer 400 reaches or exceeds upper limit PLimUp 502 of 10), FIFO controller 207 determines whether a predetermined amount of system buffer memory is available for receiving data from FIFO buffer 400. The availability of a predetermined amount of buffer memory indicates that the demand for buffer memory is low since the CPU has adequate time to process data stored in system buffer memory 102. Conversely, if the amount of system buffer memory available is less than the predetermined amount, the demand for system buffer memory 102 is high as there are few buffers available.

The predetermined value of free system buffer memory may be obtained empirically. When a predetermined amount of system buffer memory is available, FIFO controller 207 immediately transports a fixed number data packets stored in receive FIFO buffer 400 to host main memory 102. When a predetermined amount of system buffer memory is not available, FIFO controller 207 waits for more buffer memory to become available and performs data transfer upon such occurrence. If more buffer memory does not become available in a certain amount of time, data packets if FIFO buffer 400 are emptied anyway as they may have become stale.

Consider also as an example a long-short operational sequence of the flow control logic implemented as part of the alternative embodiment in the present invention. As receive FIFO buffer 400 fills up (i.e., the number of data packets inside FIFO buffer 400 reaches or exceeds upper limit PLimUp 502 of 10) FIFO controller 207 signals the external devices to request that the appropriate transmitting device stops sending data. As receive FIFO buffer 400 empties, the number of data packets eventually falls below lower limit PLimLw 501 of 5 data packets. At this point, FIFO controller 207 signals the external transmitting devices to resume transmitting data.

While the preferred embodiment monitors both the state of the FIFO buffer as well as demand of system memory which is related to the level of transactional activities, the alternate embodiment only monitors the state the FIFO buffer. As a result, system resources are more efficiently conserved under the preferred embodiment.

Figure 7:
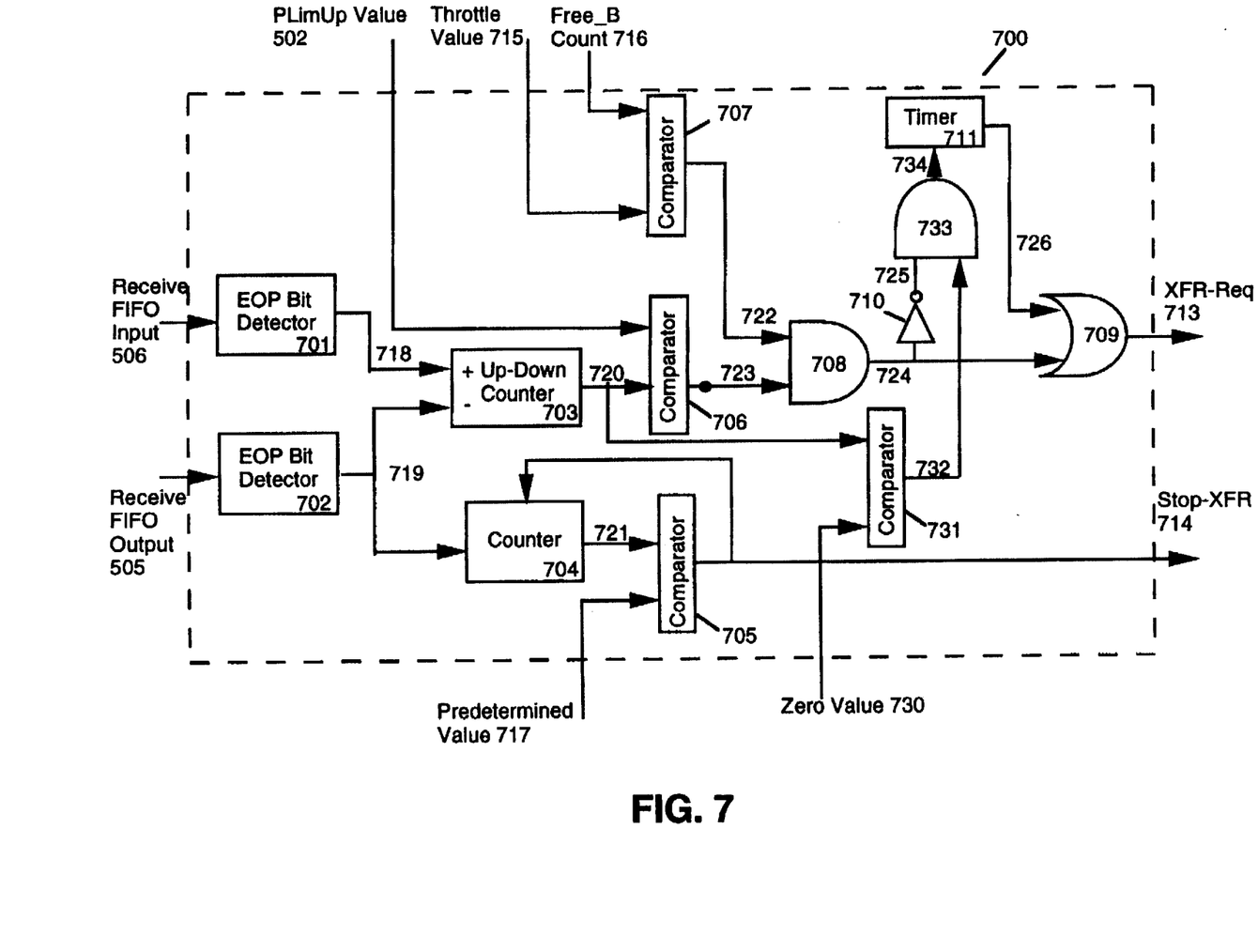
FIG. 7 is a block diagram illustrating the buffer-available control logic implemented in the preferred embodiment of the present invention.

Referring now to FIG. 7 which is a block diagram illustrating buffer-available control logic 700 implemented as part of the preferred embodiment. Buffer-available control logic 700 is implemented as part of FIFO controller 207. To handle long-shorts more efficiently, buffer-available control logic 700 monitors both the state of FIFO buffer 400 and the demand level of free memory buffer.

Because an EOP bit associated with the last entity of a data packet is set to one (1), up-down counter 703 determines the number of full data packets in receive FIFO buffer 400 at any given time by monitoring the number of EOP bits having a value of one entering and exiting receive FIFO buffer 400. As such, receive FIFO input signal 506 and receive FIFO output signal 505 are provided as inputs to EOP bit detectors 701 and 702, respectively. EOP bit detectors 701 and 702 detects EOP bits of one in data streams received and transmitted by receive FIFO buffer 400, respectively. Upon detecting an EOP bit of one in a data stream entering receive FIFO buffer 400, EOP bit detector 701 sends signal 718 to up-down counter 703. Likewise, upon detecting an EOP bit of one in a data stream exiting receive FIFO buffer 400, EOP bit detector 702 sends signal 719 to up-down counter 704. Depending on whether signal 718 or signal 719 is received, up-down counter 703 either adds or subtracts from the current EOP bit count.

Under the preferred embodiment, the size of a packet can also be easily determined using tag bits identifying data packets by counting BOP bits and/or EOP bits that have a value of zero. Packet size may provide additional information in the empirical calculation of available buffer memory.

Up-down counter 703 outputs signal 720 representing the number of full data packets presently in FIFO buffer 400. Signal 720 is supplied as an input to comparator 706. Comparator 706 receives as its other input, packet threshold value PLimUp 502 from host CPU 101. Preferably, PLimUp value 502 is programmable. Comparator 706 determines whether the current number of full data packets inside receive FIFO buffer 400 is equal to or exceeds PLimUp value 502. If the full data packet count is equal to or exceeds PLimUp value 502 indicating that receive FIFO 400 is filling up, comparator 706 asserts its output signal 723 HIGH. Otherwise, comparator 706 deasserts its output signal 723 LOW. Signal 723 is provided as an input to AND-gate 708.

To determine whether there is a predetermined number of free buffers currently available in system memory 102, comparator 707 compares throttle value 715 with free_B count 716. Free₁₃ B count 716 represents the number of free buffers currently available in system memory 102. Preferably, free_B count 716 is monitored and updated by host CPU 101. Throttle value 715 is a programmable threshold value also provided by host CPU 101. When free_B count 716 is equal to or exceeds throttle value 715 indicating that there is a low demand for system memory 102 and a low level of transactional activities, comparator 707 asserts its output signal 722 HIGH. Conversely, when free_B count 716 is less than throttle value 715 indicating a high demand for system memory 102 and a high level of transactional activities, comparator 707 deasserts its output signal 722 LOW. Signal 722 is provided as a second input to AND-gate 708. As such, the preferred embodiment of the present invention monitors both the state of FIFO buffer 400 and the demand level for system memory 102 in handling long-shorts.

When the number of full data packets in receive FIFO buffer 400 is equal to or exceeds packet threshold value PLimUp 502 and the number of free buffers available is equal to or exceeds throttle value 715, AND-gate 708 asserts a HIGH output signal 724. Otherwise, AND-gate 708 deasserts a LOW output signal 724. AND-gate 708 supplies signal 724 as an input to OR-gate 709.

Timer 711 is implemented to prevent stale data which occurs when any amount of data has been inside receive FIFO buffer 400 longer than a specified time period. Preferably, timer 711 is programmable for different time periods. Output signal 724 is inverted by inverter 710. Signal 725, the inverse of signal 724, is then provided as an input to AND-gate 733. As such, when signal 724 is HIGH, indicating that the number of full data packets in receive FIFO buffer 400 is equal to or exceeds packet threshold value PLimUp 502 and the number of free buffers available is equal to or exceeds throttle value 715, signal 725 becomes LOW. Conversely, when signal 724 is LOW, indicating any other combination, signal 725 becomes HIGH.

However, additional logic is implemented to ensure that there is data stored inside receive buffer 400 before timer 711 is activated. Signal 720 representing the number of full data packets presently in FIFO buffer 400 is provided as an input to comparator 731. Comparator 731 receives as its second input signal 730 having a value of zero (0) from host CPU 101. If signal 720 is greater than zero (0) indicating that there is one or more data packets inside FIFO buffer 400, comparator 731 asserts output signal 732 HIGH. Otherwise, comparator 731 deasserts output signal 732 LOW. Signal 732 is provided as an input to AND-gate 733. When AND-gate 733 asserts its output signal 734 HIGH indicating that there are some data inside receive buffer 400 which is being held back because packet threshold PLimUp 502 is not reached and/or there is no free buffer memory available, timer 711 is turned on. Otherwise, AND-gate 733 deasserts its output signal 734 LOW to reset and turn off timer 711. When the programmed period expires, timer 751 generates a HIGH output signal 726 which is provided as a second input to OR-gate 709.

OR-gate 709 provides as its output control signal XFR-req 713. OR-gate asserts control signal XFR-req 713 HIGH when either signal 724 or signal 726 is HIGH indicating either that receive FIFO buffer 400 is filling up and there are a number of free buffer available or that data stored is getting stale and should be unloaded. When control signal XFR-req 713 is asserted HIGH, bus interface & data path 209 goes through the normal protocol of system bus 104 to gain ownership of the bus and start a transfer.

To ensure that only a predetermined number of data packets is transmitted for any given transfer, counter 704 is implemented to monitor the number of EOP bits output from receive FIFO buffer 400. As discussed earlier, EOP bits signifies the number of full data packets. As such, counter 704 receives as its input signal 709 from EOP bit detector 702 and provides its count signal 721 as an input to comparator 705. Comparator 705 receives as its second input predetermined value 717 from host CPU 101. Preferably, predetermined value 717 is programmable. When the value of count signal 721 reaches predetermined value 717, comparator 705 asserts its output signal Stop-XFR 714 HIGH to signal bus interface & data path 209 to relinquish ownership of the bus. Stop-XFR signal 714 is also used to reset counter 704.

Figure 8:
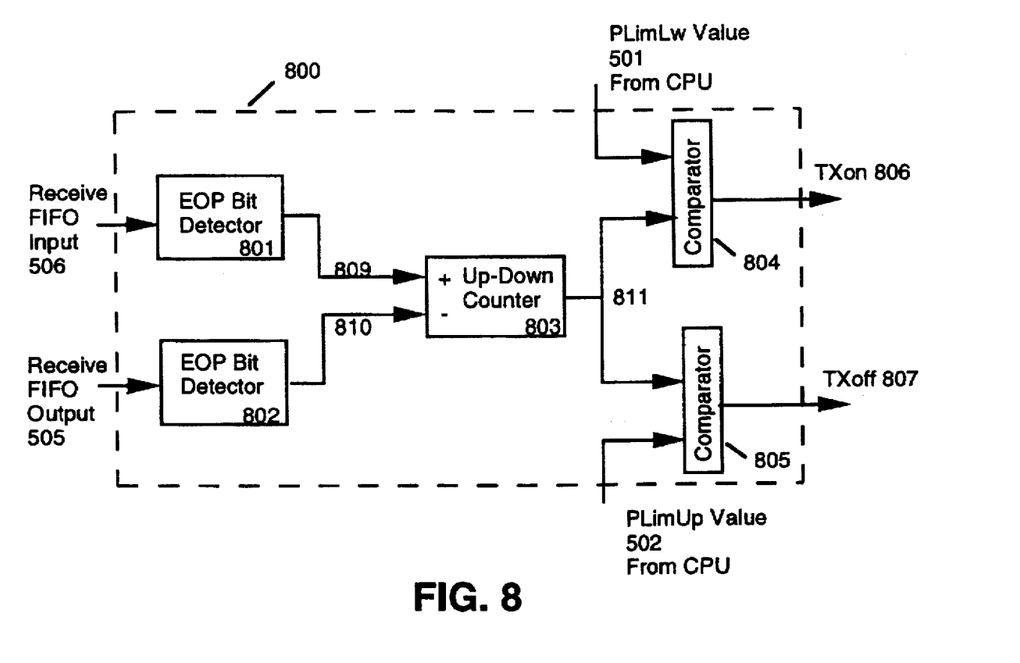
FIG. 8 is block diagram illustrating the flow-control logic implemented in the alternate embodiment of the present invention.

Reference is now made to FIG. 8 which is a block diagram illustrating flow control logic 800 implemented as part of the alternate embodiment. Flow control logic 800 is implemented as part of FIFO controller 207. The alternate embodiment of the present invention monitors the state of receive FIFO buffer 400 to determine when to load and unload data in handling long-shorts. Moreover, the alternate embodiment may implement multiple packet-based thresholds to handle long-shorts. Preferably, two packet-based thresholds are implemented.

EOP bit detectors 801 and 802 are used to detect EOP bits having a value of one (1) in data streams entering and exiting receiving FIFO buffer 400, respectively. When EOP bit detector 801 detects an EOP bit of one in the data stream entering receiving FIFO buffer 400, EOP bit detector 801 provides signal 809 as an input to up-down counter 803. Likewise, when EOP bit detector 802 detects an EOP bit of one in the data stream exiting receiving FIFO buffer 400, EOP bit detector 802 provides signal 810 as an input to up-down counter 803. Depending on whether signal 809 or signal 810 is received, up-down counter 803 adds or subtracts from the current EOP bit count which it monitors. Up-down counter 803 outputs EOP bit count signal 811 and provides signal 811 as inputs to comparators 804 and 805.

Comparator 805 receives as its second input upper packet-based threshold value PLimUp 502 from host CPU 101. Preferably, the value of PLimUp 502 is programmable. As receive FIFO buffer 400 receives data, when the EOP bit count value representing the current number of full data packets in receive FIFO buffer 400 is equal to or exceeds upper threshold value PLimUp 502, comparator 805 asserts TX-off signal 807 HIGH. Signal 807 is provided as an input to the receive engine of the serial I/O channel associated with receive FIFO buffer 400 to signal the transmitting device to stop transmitting data.

On the other hand, comparator 804 receives as its second input lower packet-based threshold PLimLw 501 from host CPU 101. Preferably, lower threshold value PLimLw 501 is programmable. As receive FIFO buffer 400 outputs data, when the EOP bit count value is equal to or less than the lower threshold value PLimLw 501, comparator 804 asserts TX-on signal 806 HIGH. Signal 806 is provided as an input to the receive engine of the serial I/O channel associated with receive FIFO buffer 400 to signal the transmitting device to start transmitting data. It should be clear to person of ordinary skill in the art that TX-on signal 806 and TX-off signal 807 can easily be used to support both out-of-band (software based) and in-band (hardware based) flow control design.

Although the present invention has been described and illustrated in detail, it is clearly understood that the same is by way of illustrations and examples only and is not to be taken by way of limitation, the spirit and scope of the present being limited only by the terms of the appended claims

I claim:

1. An apparatus for receiving a string of data packets having marking tags identifying each data packet with an external device, comprising:

a FIFO buffer for storing the data packets, the FIFO buffer being at least 32 bytes deep and having at least one packet-based threshold, the FIFO buffer receiving a FIFO input data signal and providing a FIFO output data signal;

a first monitoring unit coupled to the FIFO buffer for receiving the FIFO input and FIFO output data signals, the first monitoring unit generating a first signal indicating whether a number of data packets in the FIFO buffer is equal to or exceeds the packet-based threshold;

a second monitoring unit coupled to the FIFO buffer for generating a second signal indicating whether a predetermined number of memory buffers are available for storing data transferred from the FIFO buffer; and a data transfer unit responsive to both the first and second signals for controlling data transfer to and from the FIFO buffer.

2. The apparatus of claim 1, wherein the packet-based threshold is programmable.

3. The apparatus of claim 1, wherein the first monitoring unit monitors the marking tags in determining the number of data packets in the FIFO buffer.

4. The apparatus of claim 1, wherein the predetermined number of memory buffers is programmable.

5. The apparatus of claim 1, wherein the data transfer means initiates a data transfer request when the first signal indicates that the number of data packets in the FIFO buffer is equal to or exceeds the packet-based threshold and the second signal indicates that the predetermined number of memory buffers are available.

6. The apparatus of claim 5, wherein the data transfer unit also initiates a data transfer request when any data has been in the FIFO buffer for a predetermined period of time.

7. The apparatus of claim 6, wherein the predetermined period of time is programmable.

8. The apparatus of claim 1 further comprising a third monitoring unit for generating a stop transfer request when a predetermined number of data packets has been transferred from the FIFO buffer.

9. The apparatus of claim 8, wherein the third monitoring unit monitors the marking tags in a data stream exiting from the FIFO buffer in determining whether the predetermined number of data packets has been transferred from the FIFO buffer means.

10. The apparatus of claim 1, wherein the marking tags include a marking tag at a beginning and a making tag at an end of each data packet.

11. A computer system comprising:

a host processor;

a system memory;

a system bus coupling the host processor to the system memory; and a peripheral hardware controller interposing between the system bus and external devices; the peripheral hardware controller having an apparatus for receiving a string of data packets having marking tags identifying each data packet with an external device, the apparatus comprising:
- a FIFO buffer for storing the data packets, the FIFO buffer being at least 32 bytes deep and having at least one packet-based threshold, the FIFO buffer receiving a FIFO input data signal and providing a FIFO output data signal;
- a first monitoring unit coupled to the FIFO buffer for receiving the FIFO input and FIFO output data signals, the first monitoring unit generating a first signal indicating whether a number of data packets in the FIFO buffer is equal to or exceeds the packet-based threshold;
- a second monitoring unit coupled to the FIFO buffer for generating a second signal indicating whether a predetermined number of memory buffers are available for storing data transferred from the FIFO buffer; and
- a data transfer unit responsive to both the first and second signals for controlling data transfer to and from the FIFO buffer.

12. The computer system of claim 11, wherein the data transfer unit initiates a data transfer request when the first signal indicates that the number of data packets in the FIFO buffer is equal to or exceeds the packet-based threshold and the second signal indicates that the predetermined number of memory buffers are available.

13. The computer system of claim 12, wherein the data transfer also initiates a data transfer request when any data has been in the FIFO buffer for a predetermined period of time.

14. The computer system of claim 11 further comprising a third monitoring unit for generating a stop transfer request when a predetermined number of data packets has been transferred from the FIFO buffer means.

15. The computer system of claim 14, wherein the third monitoring unit monitors the marking tags in a data stream exiting from the FIFO buffer in determining whether the predetermined number of data packets has been transferred from the FIFO buffer.

16. A method for receiving a string of short data packets having marking tags identifying each data packet with an external device, the method comprising:

forming a data stack of at least 32 bytes deep and having at least one packet-based threshold;

monitoring the data stack for determining whether a number of data packets in the data stack is equal to or exceeds the packet-based threshold;

monitoring a system memory for determining whether a predetermined number of memory buffers are available for storing data transferred from the data stack; and transferring data from the data stack to the predetermined number of free memory buffers when the number of data packets in the data stack is equal to or exceeds the packet-based threshold and when the predetermined number of free memory buffers are available.

17. The method of claim 16 further comprising the steps of:

monitoring data unloaded from the FIFO buffer for determining whether the data transferred reaches a predetermined limit; and signaling the FIFO buffer to stop transferring data the FIFO buffer when the unloaded data reaches the predetermined limit.

18. The method of claim 16 further comprising the step of:

transferring data from the FIFO buffer when any number of data packets has been in the FIFO buffer for a predetermined period of time.

* * * * *